April 28, 1959     S. FRANKEL     2,884,107
OIL-COOLED ELECTROMAGNETIC BRAKE OR CLUTCH
Filed Nov. 15, 1954     2 Sheets-Sheet 2
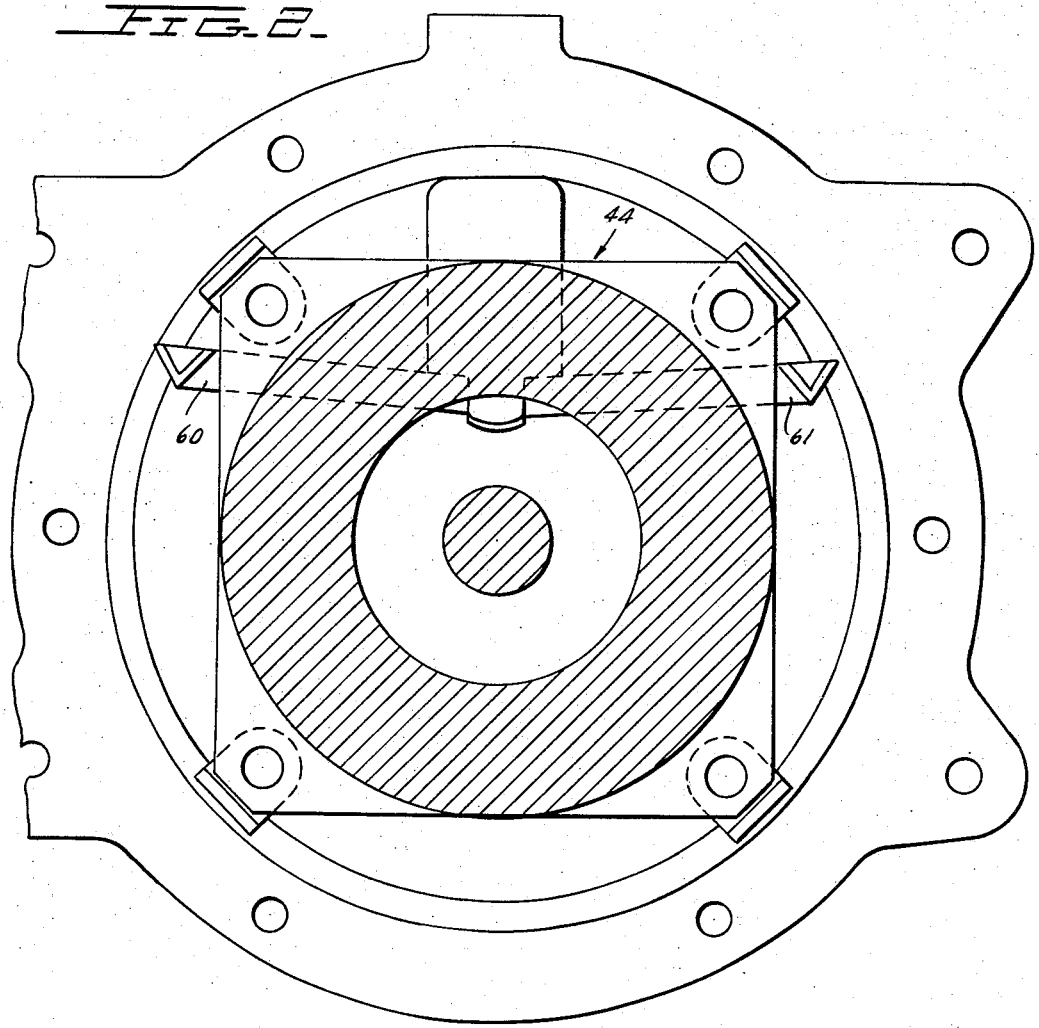
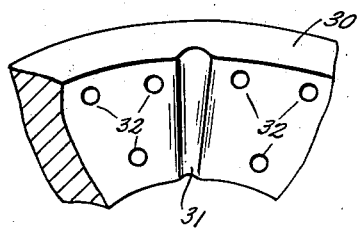
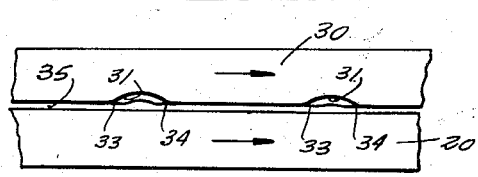
INVENTOR.
SYDNEY FRANKEL
BY
ATTORNEYS

United States Patent Office 2,884,107
Patented Apr. 28, 1959

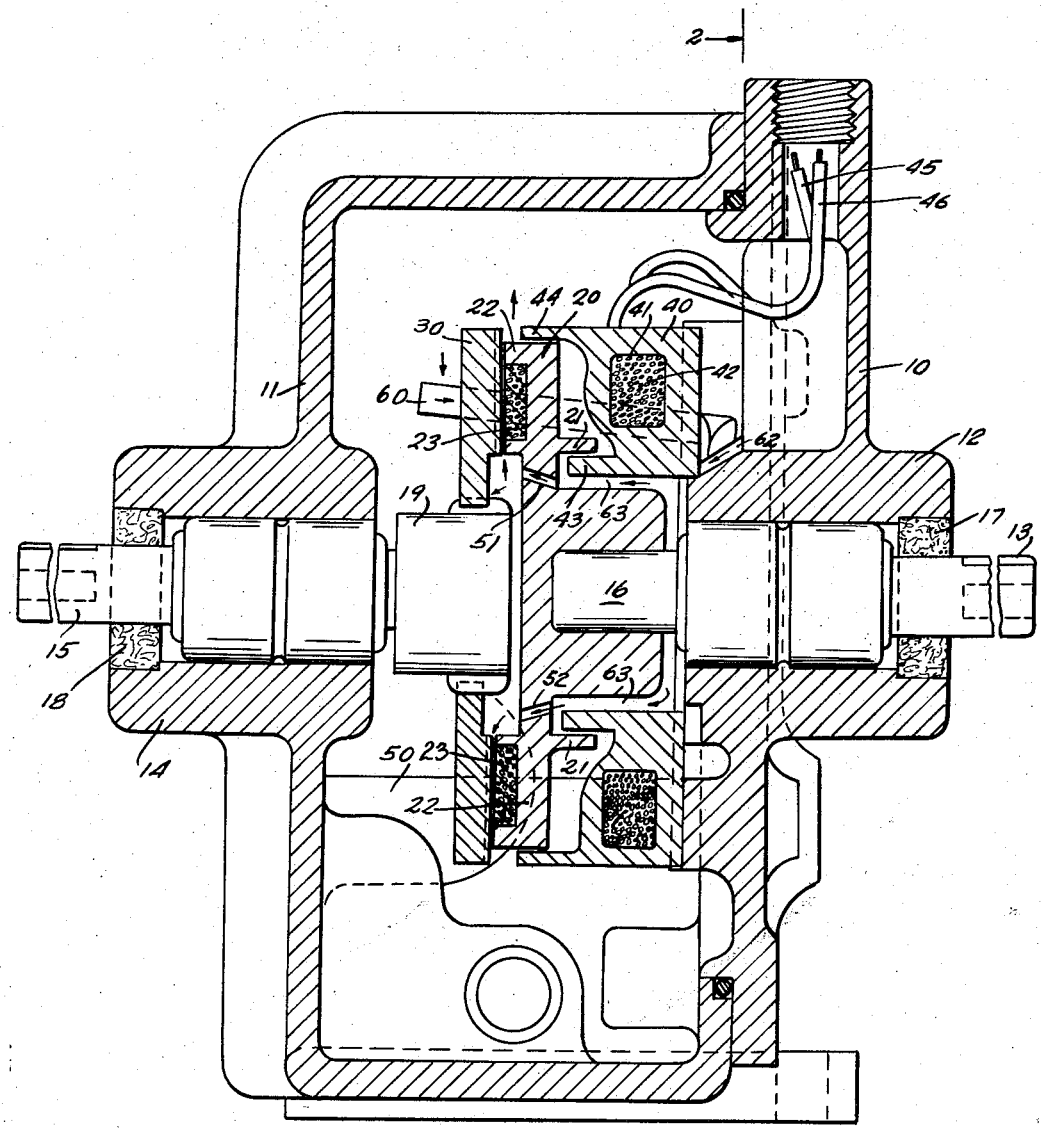

2,884,107

OIL-COOLED ELECTROMAGNETIC BRAKE OR CLUTCH

Sydney Frankel, Tenafly, N.J., assignor to Web Controls Corporation, New York, N.Y., a corporation of New York Application November 15, 1954, Serial No. 468,692

2 Claims. (Cl. 192—84)

This invention relates to an oil cooled electromagnetic brake or clutch and/or to a process or means for adding an oil cooling system to an electromagnetic brake or clutch.

Among the useful applications of magnetic clutches or brakes is that of providing tension control. A magnetic clutch or brake, for example, has a driving element and a driven element one of which may be electrically magnetized to provide a controlled amount of contact therebetween but at the same time a certain amount of slippage is permitted between the driving and driven elements.

Among the objects of the present invention is to provide an electromagnetic brake or clutch in which accurately regulated tensions between driving and driven elements may be provided by changing the voltage on the electromagnet.

Among other objects of the invention is to provide an oil cooling system which is effective in cooling the contacting surfaces of the driving and driven elements of a magnetic clutch or brake.

These objects and others ancillary thereto are obtained by providing an oil circulating system whereby a film of oil is continuously forced between the opposing adjacent surfaces of the driving and driven elements of the magnetic clutch or brake. The oil film is subject to shear which is proportional to the pressure created by the magnetic field between the driving and driven elements and the difference between input and output speeds of the unit. The oil film is constantly moved outwardly by centrifugal force and is replenished so as to provide the desired cooling effect between the driving and driven elements.

Other objects and advantages of the invention will become apparent from the following detailed description taken in connection with the accompanying drawings, in which Fig. 1 is a side cross-sectional view of a magnetic clutch embodying the present invention.

Fig. 2 is a cross sectional view taken on line 2—2 of Fig. 1.

Fig. 3 is a detail view of a portion rotating plate element.

Fig. 3A is a detail edge view of the two rotating parts of the magnetic clutch.

The clutch shown is enclosed by the cover 10 and the housing 11. Cover 10 includes the bearing element 12 for shaft 13 of the driving element 20 whereas housing 11 contains bearing 14 for the shaft 15 of the driven element 30. The driving element 20 is fixed on the end 16 of shaft 13. Oil seals are provided at 17 and 18.

The driving element 20 is shown with an annular flange 21 projecting toward shaft 13 and an annular portion 22 projecting away from shaft 13. The radial surface of projecting portion 22 is the portion through which contact with the driven member 30 is established. The effect of the device is improved by lining a portion of the projecting portion 22 with cork 23 although the cork lining 23 is not essential to the operation of the device.

The magnetizing ring 40 is fixed in stationary position with respect to the cover 10 and includes a core portion 41 in which the electromagnetic coil 42 is positioned and two annular flanges 43 and 44. Flange 43 is concentric with and close to flange 21 of rotor 20 and flange 44 is concentric with and surrounds the outside edge of the rotor 20. The clearance between the flanges 43 and 44 and the adjacent parts of rotor 20 is very slight so that the rotor 20 is effectively magnetized by stator 40. Coil 42 is electrically connected by lines 45 and 46 to a source of direct current.

The driven element 30 is splined to collar 19 fixed to the inner end of shaft 15. Thus, the element 30 is adapted to be drawn more or less closely to the driver element 20. The magnetic clutch or brake described thus far, by itself, is not part of the present invention but instead the present invention is concerned with providing such a device with an oil circulating system whereby an oil film is continuously supplied between the adjacent surfaces of the driving member 20 and the driven member 30. The lower portion of the device is shown as immersed in oil 50. Even though the edges of driving member 20 and driven member 30 dip into oil 50 there is no substantial and continuous penetration of oil between the contacting surfaces of these elements. According to the present invention a number of diverging orifices 51, 52 are provided in the driving rotor 20. Also, collecting means or troughs 60, 61 are provided in the upper portion of the housing 11. After oil is thrown to the sides of housing 11 it is collected in troughs 60, 61 and fed to the passage 62 in bearing 12. From passage 62 the oil passes to the space 63 between the interior edge of stator 40 and the outer edge of rotor 20. Thence the oil passes through openings 51, 52. A minor portion of the oil fed to space 63 may pass between the concentric annular flanges 21 and 43 but for the most part the oil flows through openings 51, 52. The centrifugal force throws the oil from openings 51, 52, against the inner edges of the contacting surfaces of driving element 20 and driven element 30.

One of the members 20 or 30 contains radial grooves. In the device shown the driven rotor 30 contains the radial grooves 31. Radial grooves have been employed heretofore in connection with such clutches or brakes but according to this invention the radial grooves 31 are provided with rounded side edge portions 33, 34 to enable oil in the grooves 31 to be drawn into the area between rotors 20 and 30. The oil from passages 51, 52 tends to flow outwardly through grooves 31. However, since driving rotor 20 is rotating at a different higher speed than driven rotor 30 and since the side edge portions 33, 34 of grooves 31 are rounded off a continuous thin film of oil flows to the narrower spaces between rotors 20 and 30. When both rotors are operating at the same speed no lubrication is required. When the speed increases and/or when the difference in speed increases and/or when the pressure between the plates 20 and 30 increases, the need for lubrication and cooling also increases. The device of the invention automatically compensates for the increase in speed or the increased difference in speed due to the fact that as the difference in speed increases more oil is drawn into the area between rotors 20 and 30 and as the speed increases the centrifugal force feeding the oil to the grooves 31 increases, etc. When the pressure increases, oil is drawn into the area between the plates at a higher pressure (a hydrodynamic lubrication phenomenon). An oil film is thus formed and is continuously pulled into the area between the rotors 20 and 30 due to the surface tension of the oil and this film is continuously changing; the oil being thrown away from said rotors is replenished by oil from passages 51, 52. Since oil has a very high and uniform shear strength and since there are no sharp side edges on the grooves 31, the film of oil between the rotors is continuous and the torque applied is constant. The oil film continuously cools the contacting surfaces of the driving rotor 20 and driven rotor 30 which without the oil film would become very hot.

The features and principles underlying the invention described above in connection with specific exemplifications will suggest to those skilled in the art many other modifications thereof. It is accordingly desired that the appended claims shall not be limited to any specific feature or details thereof.

I claim:

1. In an electromagnetic clutch or brake device of the type comprising a housing containing a driven rotor, a coaxial driving rotor, driving and driven disk-like, ring-shaped, parallel, surfaces on the driving rotor and driven rotors defining an intersurface area, one of said driving and driven rotors being mounted for axial movement toward the other of said rotors whereby the said ring-shaped surface thereof is adapted to approach the ring-shaped surface of the other rotor while remaining parallel thereto, and means for magnetizing a first of said driving and driven rotors to vary the torque exerted by the driving rotor on the driven rotor, said magnetizing means comprising pole pieces extending adjacent to the inner and outer edges of the ring shaped surface of said first rotor, a cork ring on the first rotor between said inner and outer edges of the ring-shaped surface of said first rotor and facing the ring-shaped surface of the other rotor, and in combination therewith an improved oil cooling system comprising means for collecting oil thrown against the walls of said housing, grooved passages extending in a generally radial direction in the portion containing said ring-shaped surface of one of said driven and driving rotors for feeding oil to the intersurface area of said rotors, means for feeding oil from said collecting means to said passages, said radial passages having rounded side edge portions whereby the centrifugal force created by the rotation of said rotor forces oil through said radial passages and the surface tension of the oil at the rounded side edges provides a film of oil between the intersurface area of said driving and driven rotors, said pole pieces of the magnetizing means on the inner and outer edges of said ring-shaped surface of said first rotor cooperating with said rotors to provide pressure on said film of oil over substantially the whole of said intersurface area.

2. The combination as defined in claim 1 wherein said grooved radial passages with rounded side edges are also flared toward the outer edge of the rotor.

References Cited in the file of this patent

UNITED STATES PATENTS

| | | |
|---|---|---|
| 762,622 | Eastwood | June 14, 1904 |
| 1,928,301 | Pierson | Sept. 26, 1933 |
| 2,288,274 | Ewaldson | June 30, 1942 |
| 2,516,544 | Breeze | July 25, 1950 |
| 2,576,156 | Trofimov | Nov. 27, 1951 |
| 2,620,900 | Du Rostu | Dec. 9, 1952 |

FOREIGN PATENTS

| | | |
|---|---|---|
| 150,301 | Great Britain | Oct. 7, 1920 |
| 894,029 | France | Dec. 12, 1944 |